3,579,565
SULFONATE MONOMERS
Joel A. Zaslowsky and Henry Gould, Baltimore, Md., assignors to Alcolac Chemical Corporation, Baltimore, Md.
No Drawing. Filed June 12, 1967, Ser. No. 645,493
Int. Cl. C07c 69/54, 69/60
U.S. Cl. 260—485                  3 Claims

ABSTRACT OF THE DISCLOSURE

A new class of sulfonate monomers, both as new compositions of matter, and homopolymers and copolymers containing them.

---

This invention relates generally to novel compositions of matter of aliphatic sulfonates which are especially useful as monomers for both new homopolymers and copolymers, and more particularly to aliphatic esters of acrylic and methacrylic acids containing a sulfonate radical.

It is an object of this invention to provide a new class of sulfonate monomers.

It is another object to prepare monomers which may be employed for preparation of both homopolymers and copolymers.

Another object is to provide novel sulfonate polymers.

A further object of the invention is to provide sulfonate monomers which yield homopolymers and copolymers when polymerized.

Other and further objects of the invention will become evident from the detailed description set forth hereinbelow.

Various sulfonate monomers have been known for some time as have homopolymers and copolymers made from them. These have chiefly been those of the aromatic type. These known sulfonate-containing polymers have many established uses such as ion exchange resins, electroconductive polymers, providing reactive dye sites in polymers, coagulants for water treatment and others which will be apparent to practitioners in this field. However, the known monomers and polymers for these systems present certain difficulties. For example in the case of styrene sulfonates, either the polymer contains great amounts of inorganic impurities or the molecular weights are low, the chain length depending on the method of preparation. In the case of the other sulfonates such as the vinyl and substituted vinyl or the allyl ether sulfonates as well as the pure styrene sulfonate monomer, they have been found difficult to react both in homopolymerization and copolymerization with other monomers.

The sulfonate monomers of this invention include the class of compounds having the following generic formula:

A      $\underset{\underset{OH}{|}}{HC=C-C-O-CH_2-CH-CH_2SO_3X}$  with $R_2, R_1, O$ substituents wherein $R_1$ is methyl or hydrogen, wherein $R_2$ is hydrogen or $-C\underset{OR_3}{\overset{O}{\diagup\!\!\!\diagdown}}$ or B  $HC\underset{\underset{HC-C-O-CH_2-CHOH-CH_2SO_3X}{\overset{O}{\parallel}\;\overset{O}{\parallel}}}{\overset{\overset{O}{\diagup\!\!\!\diagdown}}{\diagdown}}O-CH_2-CHOH-CH_2SO_3X$ and where X is hydrogen, or a cation derived from an alkali metal, alkaline earth metal, ammonia, or monovalent amine.

The A group of compounds above defined are monosulfonates in which the $R_1$ radical may be methyl or hydrogen, and the $R_2$ radical may be hydrogen or $-CO-OR_3$ where the $R_3$ may be either a straight-chain or a branched chain alkyl radical having from one to eighteen carbon atoms, for example, methyl, ethyl, propyl, isopropyl, butyl, isobutyl, tertiary-butyl, amyl, isoamyl, hexyl, octyl, isooctyl, decyl, dodecyl, hexadecyl, and so forth.

For the class B group of compounds, where it is possible for the sulfonate monomers containing two or more sulfonate groups to exist in both cis and trans form, it is intended to include both forms as useful. For example, the di-sulfonate may be derived either from maleic or fumaric acid and it is intended to include both types of derivatives as embodiments of this invention.

It has been found possible to employ various synthetic routes for the preparation of these compounds. For example, in the preparation of the methacrylate compound the following routes were used, although synthetic methods for preparing the monomers are not limited to these methods.

(1) An appropriate aliphatic compound having a sulfonate group and a reactive chloro group can be reacted with, for example, the sodium salt of methacrylic acid.

$NaSO_3CH_2-CHOH-CH_2Cl + CH_2=\underset{\underset{CH_3}{|}}{C}-\underset{\overset{O}{\parallel}}{C}ONa \longrightarrow$ $CH_2=\underset{\underset{CH_3}{|}}{C}-\underset{\overset{O}{\parallel}}{C}-OCH_2-CHOHCH_2SO_3Na + NaCl$ (2) Glycidyl methacrylate or other appropriate compound can be reacted with sodium bisulfite.

$H_2C=\underset{\underset{CH_3}{|}}{C}-\underset{\overset{O}{\parallel}}{C}-O-CH_2-\underset{\underset{O}{\diagdown\!\!\!\diagup}}{CH-CH_2} + NaHSO_3 \longrightarrow$ $CH_2=\underset{\underset{CH_3}{|}}{C}-\underset{\overset{O}{\parallel}}{C}-OCH_2-\underset{\underset{OH}{|}}{CH}CH_2SO_3Na$ (3) The mono-chloro derivative of glycidyl methacrylate can be reacted with sodium sulfite.

$CH_2=\underset{\underset{CH_3}{|}}{C}-\underset{\overset{O}{\parallel}}{C}-OCH_2-CHOHCH_2Cl + Na_2SO_3 \longrightarrow$ $CH_2=\underset{\underset{CH_3}{|}}{C}-\underset{\overset{O}{\parallel}}{C}-OCH_2-\underset{\underset{OH}{|}}{CH}-CH_2SO_3Na + NaCl$ The sulfonate monomers which constitute the subject matter of the invention are improved products over those presently known in that they give high molecular weight polymers when subjected to homopolymerization and also copolymerize readily with vinyl, acrylate, and other known, unsaturated polymerizable systems.

For example the polysulfonates are useful for moldable high-impact thermoplastic resins. The sulfonate polymers are also found useful for making films and fibers and in coatings.

It is possible to prepare the high molecular weight polysulfonate homopolymers and copolymers both by solution and interfacial polymerization techniques.

The sulfonates have been found most useful both as homopolymers and as copolymers. For example, the sulfonate monomers may be combined with the carboxylic monomers to give polymers of the sulfonate-carboxylate system having stable linkages and good mechanical properties.

It is well known that polymers of such monomers as acrylonitrile and the vinyl chloride ethers, when used to make fibers give products which are difficult to dye and often do not have sufficient dye affinity to enable dyeing by conventional dyeing techniques. The dyes which are applied are neither dye fast nor are they light fast or stable to laundering and dry cleaning operations.

If these monomers are copolymerized with sulfonate containing monomers such as those of the present invention, the copolymers so produced are readily dyeable with commercial dyes using techniques known to the industry.

It is to be understood that it is the new compositions of matter which constitute the novel subject matter of this invention. It is possible as indicated above, to prepare the novel monomers, by a variety of reactions which have been illustrated herein. These types of chemical reactions are known in the chemical art.

There are below presented a number of examples which are illustrative only, and it is not intended to limit the invention in any way except in accord with the scope of the appended claims.

EXAMPLE 1

Preparation of mono methacrylic acid ester of 2-3 dihydroxy propane sodium sulfonate One mole of methacrylic acid (86 g.) is suspended in 600 g. monomethylether of ethylene glycol with 40 g. of flake caustic soda and 1-2% of hydroquinone as a polymerization inhibitor. The resulting mixture is heated to 100-105° C. and 196 g. of 3-chloro-2-hydroxypropane sodium sulfonate added. The reaction mass is held for six hours at 100-105° C. and then fitlered at reaction temperature to remove the by-product formed salt and unreacted 3-chloro-2-hydroxypropane sodium sulfonate. The mixture is then cooled and the product filtered off, washed with solvent and dried. The dry powder assays over 80% of the desired product by ester number.

EXAMPLE 2

Preparation of mixed maleic acid ester of methanol and 2-3 dihydroxy propane sodium sulfonate One mole of monomethyl ester (130 g.) of maleic acid in 500 cc. of ethylene glycol monomethyl ether is treated with 40 g. of solid caustic soda and then reacted at 115° (under reflux) with 200 g. of 3-chloro-2-hydroxy-propane sodium sulfonate. Reflux is maintained for six hours and then the resulting mixture is filtered at 110-115° C. to remove salt produced in the reaction and unreacted chloro compound. The reaction mixture is cooled and the product filtered and washed and dried. The product powder assays over 75% active by ester number.

EXAMPLE 3

Preparation of bis (2-hydroxy, 3-sodium sulfonate propyl fumarate

One mole fumaric acid in 1,000 g. of monomethyl ether of ethylene glycol is reacted with 80 g. of solid sodium hydroxide and then 400 g. 3-chloro-2-hydroxypropane sodium sulfonate at 120° C. under reflux. Reflux is continued for six hours and the reaction mixture filtered at 120° C. The filtrate is cooled, filtered, and the crystalline product washed and dried. The product is a powder and assays 80-85% product.

Using the sodium salts as prepared above in the examples, it is possible to prepare the other alkali metal, alkaline earth, ammonium and monovalent amine salts as well as the salts of the heavy metals, such as, for instance, K, Li, Ca, Bu, Sr, Mg, Cu, Fe, NH$_4$, and various monovalent amine salts. These are most conveniently prepared by passing the sodium salts through an ion exchange resin such as Dowex 50 or Amberlite containing the desired cations. The corresponding free acids are also similarly prepared by passage of the salt through the appropriate ion exchange resin.

The invention has been described hereinabove in preferred embodiment, but it is to be understood that the invention is in no way confined to the particular forms, uses or sizes shown and described, the same being merely illustrative, and that the invention may be made and carried out in other ways without departure from the spirit of the invention, and therefore there is claimed the right to employ all equivalents coming within the scope of the appended claims and by means of which the objects of the invention are obtained and new results and advantages accomplished.

What is claimed is:
1. As a composition of matter, an ester having the formula

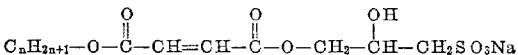

wherein $n$ is an integer of 1 to 18, derived from either maleic or fumaric acid.

2. As a composition of matter, the bis (2-hydroxy, 3-sodium sulfonate propyl) maleate.

3. As a composition of matter, the bis (2-hydroxy, 3-sodium sulfonate propyl) fumarate.

References Cited

UNITED STATES PATENTS 3,147,301   9/1964   Sheetz _____ 260—485J

LORRAINE A. WEINBERGER, Primary Examiner

E. J. SKELLY, Assistant Examiner

U.S. Cl. X.R.

260—79.3, 86.1, 486